United States Patent [19]

Goetzinger et al.

[11] Patent Number: 4,926,340
[45] Date of Patent: May 15, 1990

[54] LOW POWER PROCESS MEASUREMENT TRANSMITTER

[75] Inventors: Charles E. Goetzinger, Bloomington; Dale W. Borgeson, Minneapolis, both of Minn.

[73] Assignee: Rosemount Inc., Eden Prairie, Minn.

[21] Appl. No.: 317,017

[22] Filed: Feb. 28, 1989

Related U.S. Application Data

[63] Continuation of Ser. No. 883,982, Jul. 10, 1986, abandoned.

[51] Int. Cl.$^5$ ............... G01R 19/00; G06F 11/30; G06F 1/00
[52] U.S. Cl. .................... 364/483; 364/900; 364/932.8; 364/921.9; 364/923.1; 364/923.2
[58] Field of Search ... 364/200 MS File, 900 MS File, 364/483

[56] References Cited

U.S. PATENT DOCUMENTS

| | | | |
|---|---|---|---|
| 4,041,470 | 8/1977 | Slane et al. | 364/900 |
| 4,122,719 | 10/1978 | Carlson et al. | 73/342 |
| 4,212,078 | 7/1980 | Games et al. | 364/900 |
| 4,403,297 | 9/1983 | Tivy | 364/579 |
| 4,404,475 | 9/1983 | Drori et al. | 307/264 |
| 4,412,284 | 10/1983 | Kerforne et al. | 364/200 |
| 4,442,481 | 4/1984 | Brahmbhatt | 363/60 |
| 4,445,198 | 4/1984 | Eckert | 364/900 |
| 4,466,074 | 8/1984 | Jindrick et al. | 364/569 |
| 4,494,183 | 1/1985 | Bayer et al. | 364/154 |
| 4,520,488 | 5/1985 | Houvig et al. | 375/5 |
| 4,598,373 | 7/1986 | Morishita et al. | 364/424 |
| 4,646,248 | 2/1987 | Reynolds | 364/483 |

OTHER PUBLICATIONS

INTEL, *Memory Components Handbook*, 1984, Chapter 5, pp. 9–11, 68–72 and 83–103.

*Primary Examiner*—Gareth D. Shaw
*Assistant Examiner*—Christina M. Eakman
*Attorney, Agent, or Firm*—Kinney & Lange

[57] ABSTRACT

A transmitter couples an output to a loop which represents a sensed process variable such as pressure. A microprocessor-based circuit in the transmitter senses the process variable and computes an output signal and provides the output to the loop. A communication circuit in the transmitter receives a high frequency signal including a transmitter parameter from the loop. The communication circuit couples the parameter to the microprocessor. The microprocessor couples the parameter to an EEPROM. The high energization requirements of the EEPROM during a WRITE interval are supplied by an energization circuit. The energization circuit receives energization from the loop at a low rate so that the output is not substantially disturbed. The energization circuit stores energy and supplies energization to the EEPROM during the WRITE time interval without substantially disturbing the loop current.

18 Claims, 1 Drawing Sheet

LOW POWER PROCESS MEASUREMENT TRANSMITTER

This is a continuation of application Ser. No. 06/883,982, filed July 10, 1986 (now abandoned).

BACKGROUND OF THE INVENTION

FIELD OF THE INVENTION

This invention relates to a transmitter for coupling an output representative of a process variable to a loop.

SUMMARY OF THE INVENTION

This invention relates to a transmitter for coupling an output representative of a process variable to a loop as a function in a measurement of the process variable utilizing the appropriate parameter or parameters for generating the output. The transmitter comprises computing means coupled to the process variable and the loop. The computing means sense the process variable, compute an output and provide the output to the loop. Receiver means are coupled to the computing means for receiving a parameter or parameters and providing the parameter or parameters to the computing means. Memory means are coupled to the computing means for receiving the parameter or parameters from the computing means and storing the parameter or parameters. The memory means comprises an energization input for selectively energizing the memory means at a first energization rate during a WRITE time interval. The energization requirements of the transmitter exceed the energization available from the loop during the WRITE time interval. Energization means are coupled to the loop for receiving energization from the loop at a second energization rate lower than the first energization rate. During the WRITE time interval, the energization means selectively couples energization at the first energization rate to the memory means. The energization means preferably comprises storage means which store energy for coupling to the memory means during the WRITE interval. In a preferred embodiment, the energization means couples multiple storage means in series to achieve the desired first energization rate.

DETAILED DESCRIPTION OF THE PREFERRED EMBODIMENTS

Figure 1:
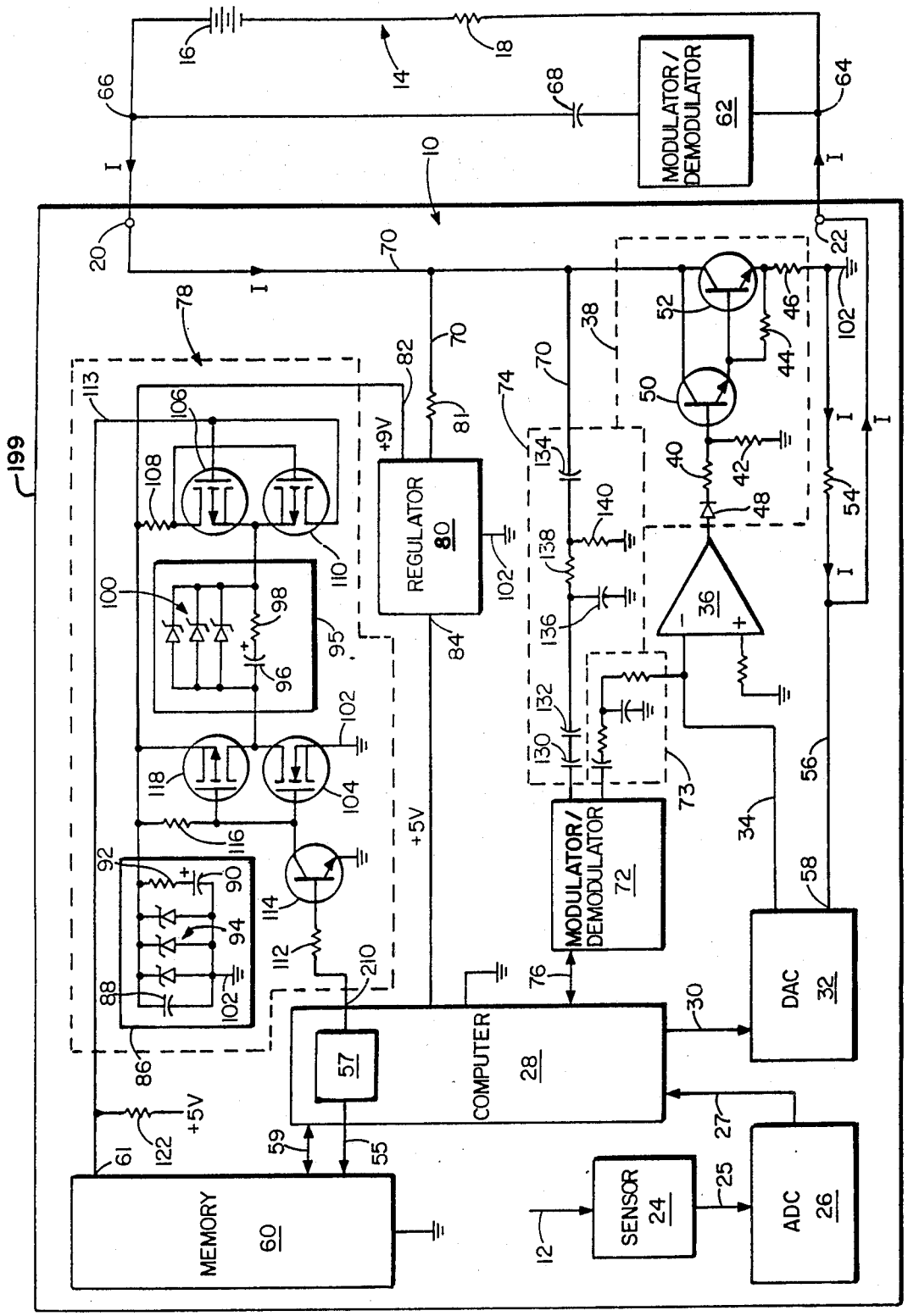
FIG. 1 is a diagram of a transmitter according to this invention.

In FIG. 1, a transmitter 10 is shown coupled to a process variable 12 such as a pressure, a temperature, or a flow and to a 4–20 milliampere current loop 14. The loop 14 comprises a battery or power source 16 and a readout device such as a meter or recorder represented schematically as resistance 18 coupled in series to transmitter 10. The loop 14 couples to a pair of terminals 20, 22 in the transmitter 10 and energizes the transmitter 10. The transmitter 10 controls the loop current I to vary between 4 and 20 milliamperes and the magnitude of such loop current I is representative of the sensed process variable 12. The power source 16 typically provides a limited excitation potential, for example, 17 to 30 volts. A voltage drop in the readout device 18 can reduce the excitation or energization potential available at terminals 20, 22 to as little as 12 volts in some cases. It is desired to have the transmitter energized at the 4 mA loop current level and hence there can be as little as 48 milliwatts available for energization of transmitter 10. The loop current has frequency components ranging between a steady or DC level up to 100 Hertz, for example, and hence it is a low frequency signal.

The transmitter 10 comprises a sensor 24 coupled to sense the process variable 12. The sensor 24 can comprise a capacitive or strain gauge pressure sensor for sensing process fluid pressure, for example. Sensor 24 couples a sensor signal along line 25 to an analog-to-digital converter or ADC 26 which converts the sensor signal to a digital signal representative of the sensed process variable 12. A line, such as line 25, as used in this specification can comprise a bus or multiple conductors. The converter 26 couples the digital signal representative of the process variable along line 27 to a computer 28 which can comprise a low power microprocessor, read-only-memory, random access memory, a clock circuit for timing the microprocessor, input-output circuitry and other circuitry useful for performing computations and control functions. The computer 28 calculates a desired magnitude for the output current I which represents the process variable 12 and couples a signal representing the desired magnitude of the current I on line 30 to a digital-to-analog converter or DAC 32. Converter 32 couples a signal on a line 34 to amplifier 36 for controlling the loop current I. The amplifier 36 couples a control signal to a current control network 38 comprising resistors 40, 42, 44, 46 and diode 48 and transistors 50 and 52 connected in a Darlington configuration for controlling the loop current I. The network 38 is coupled to terminals 20, 22 and controls the flow of current I. A sense resistor 54 is coupled in series between the network 38 and terminal 22. The potential across sense resistor 54 is representative of the loop current I and this potential is coupled along line 56 to a high impedance input 58 in converter 32. The converter 32 compares the signal representative of the desired magnitude of loop current received on line 30 from computer 28 to the signal representative of actual loop current received on line 58 and controls the current control network 38 such that the loop current I is substantially the desired value representative of the process variable 12. The sensor 24, converter 26, computer 28, converter 32, amplifier 36, network 38, and resistor 54 comprise a computing means for sensing the process variable 12 and for computing and providing the output loop current I.

Transmitter 10 has operating parameters which can be adjusted from time to time to suit the transmitter's application. Transmitter 10 can be a pressure transmitter and pressure transmitter parameters such as zero, span and damping can be adjusted. In some applications, it is desirable to have a linear relationship between process pressure and loop current I, but in other applications a square root relationship between process pressure and loop current I is desirable. Such relationships are transmitter parameters which can be adjusted by altering data or constants stored in a memory 60. The memory 60 preferably comprises a non-volatile memory and thus adjustable data or constants which determine transmitter parameters are stored during periods of time when the transmitter is not energized. The memory 60 is further an electrically alterable memory and hence the data determining transmitter parameters which are stored in memory 60 can be adjusted by an electrical signal applied to the transmitter 10. Parameters of transmitter 10 can thus be adjusted without opening a sealed housing 199 enclosing the transmitter circuitry.

A modulator/demodulator 62 can be coupled to the loop 14 at connections 64 and 66 for changing or altering a parameter of the function executed on transmitter 10 or changing the function selected to be executed. A blocking capacitor 68 is coupled in series with the modulator/demodulator 62 for preventing flow of low frequency loop current I through the modulator/demodulator 62. The modulator/demodulator 62 transmits and receives high frequency serial FSK (frequency shift keyed) signals on the loop 14. The frequency components of the signals coupled through the modulator/demodulator 62 are high frequency, preferably in the range of 1.2 Kilohertz or higher so that such high frequency communication signals do not substantially disturb the low frequency loop current I. The high frequency communication signal and the low frequency loop current are simultaneously superimposed on one another in the loop 14. The frequency separation between the communication signal and the loop current and filtering reduce interference between the two signals in the transmitter 10. An operator enters data which represents desired operating parameters into modulator/demodulator 62 and such data is included in the high frequency communication signal transmitted along loop 14 to transmitter terminal 20. The high frequency signal is coupled from terminal 20 along line 70 to a second modulator/demodulator 72. A filter network 74 comprising capacitors 130, 132, 134 and 136 and resistors 138 and 140 in line 70 blocks the flow of low frequency loop current I to the second modulator/demodulator 72 and thus provides filtering. The second modulator/demodulator 72 comprises demodulator means for demodulating the signal received from line 70 and Universal-asynchronous receiver/transmitter or UART means for coupling the received data included in the high frequency signal to the computer 28 along line 76. Computer 28 transfers the data received from second modulator/demodulator 72 to memory means 60 along line 59 during a WRITE time interval. A control circuit 57 in the computer 28 is coupled along a line 55 to the memory means 60 for controlling the memory means 60. The second modulator/demodulator 72 further comprises a modulator coupled to the UART for communicating data from the transmitter 10 to the modulator/demodulator 62. A modulated, high frequency signal is coupled from modulator/demodulator 72 through a filtering network 73 to amplifier 36. Amplifier 36 controls network 38 to superimpose the high frequency signal on the loop current I. The modulator/demodulator 62 receives the high frequency signal from loop 14 and demodulates and decodes the signal to provide a readout of data communicated by the computing means, such data can include the transmitter's operating parameters such as span, zero and damping.

During a WRITE time interval, the memory 60 is energized at an energization input 61 for erasing data representative of old parameters and for writing data into memory 60 representative of new parameters. The energization requirements of the memory means 60 are high during the WRITE interval. The combined energization requirements of the memory means 60 during the WRITE interval and the rest of the circuitry in transmitter 10 can greatly exceed the rate of energization available from loop 14, particularly when the desired output current is near 4 mA. The memory 60, for example, can require up to 20 milliamperes at 17 volts during the write time interval, and the energization rate required by the memory means 60 can thus be as high as 340 milliwatts at a time when as little as 48 milliwatts is available from the loop 14. If energization were coupled directly from the loop 14 to the energization input 61, the loop current I would be greatly disturbed and the output of the transmitter would thus be very inaccurate during the WRITE interval. To overcome this problem, the transmitter comprises energization means 78 which couple energization during the WRITE interval at a first energization rate to the energization input 61, and receive energization from the loop 14 at a second energization rate lower than the first energization rate such that the loop current or output is substantially undisturbed by energization of the memory means during the WRITE interval. The WRITE time interval is controlled by the control circuit 57 to a preselected interval, for example a 400 microsecond pulse, such that energization demands of the transmitter 10 do not substantially exceed the energization available from the loop. Actuations of the WRITE time interval can be spaced apart in time to further limit energization requirements from the loop. In one preferred embodiment, for example, actuations of the 400 microsecond WRITE pulses are set at a 4% duty cycle such that only a 500 microampere or less disturbance occurs in the loop current during the WRITE pulse. In another preferred embodiment, the duty cycle of the WRITE pulses is set to 2% to reduce the disturbance in the loop current during the WRITE pulse to such a low level that the 4 mA loop current is undisturbed. Energization is coupled from the loop 14 along line 70 to a voltage regulator 80. Voltage regulator 80 is coupled to a DC common potential 102. Voltage regulator 80 produces a first regulated potential "+9 V" on line 82 and a second regulated potential "+5 V" on line 84 with respect to the DC common potential on line 102. The second regulated potential and the DC common potential are coupled to the computer 28, converters 26, 32, amplifier 36, memory 60 and sensor 24 for energizing these portions of the transmitter 10. The first regulated potential is coupled along line 82 to the energization means 78. The regulator 80 limits the magnitudes of the first and second regulated potentials. A resistor 81 couples the regulator to line 70 and limits the amount of loop current which is drawn from line 70 by the regulator 80.

The energization means 78 comprises an energy storage network 86 coupled between lines 82 and 102 for storing energy. Energy storage network 86 comprises a capacitor 88 coupled directly to the line 82 and a capacitor 90 coupled in series with a current limiting resistance 92 to line 82. Capacitors 88 and 90 receive energization from line 82 and store the energy for later coupling to the input 61 during a WRITE interval. Multiple Zener diodes 94 in network 86 provide multiple or redundant limits on the energy stored in network 86 under fault conditions. The energization means 78 further comprises a second energy storage network 95 comprising a capacitor 96 coupled in series with a current limiting resistor 98. Multiple Zener diodes 100 in network 95 provide multiple or redundant limits on the energy stored in network 95 under fault conditions. During normal operation of transmitter 10 when there is not a WRITE interval, network 95 is coupled to a DC common potential 102 through a switch 104; network 95 is also coupled to the +9 V potential on line 82 through switch 106 and current limiting resistor 108. Capacitor 96 in network 95 is thus charged at a controlled low rate through current limiting resistor 108 during normal operation to the +9 V potential and stores energy. The control circuit 57 in computer 28 couples a control signal on line 210 through resistance 112 to the base of a transistor switch 114. The collector of transistor switch 114 is coupled to the line 82 through a resistor 116. The collector of transistor switch 114 is also coupled to the gates of switches 104 and 118. Computer 28 thus controls the conduction of switches 104 and 118 in the energization means 78. During a WRITE interval, the transistor switch 114 conducts and couples a low potential to the gates of switches 104 and 118. The switch 102 is opened and the switch 118 is closed during the WRITE interval. The closure of switch 118 couples a potential through energy storage network 95 to switches 106 and 110 shutting off switch 106 and turning on a switch 110. The switching of switches 104 and 118 couples a signal through network 95 which inherently controls the switching of switches 106 and 110 and hence further control circuitry is not needed for controlling switches 106 and 110. The switching action couples the energy storage networks 86 and 95 in series with the memory 60 such that a potential of approximately twice the second regulated potential is applied along conductor 113 to the memory means 60. The energy storage networks 86 and 95 discharge stored energy at a high rate during the WRITE interval to provide the rate needed by the memory means 60. The pulse applied to the energization means 78 from the control output 210 is of a controlled short duration so that only a limited amount of energy is consumed by the memory means 60 during the WRITE time interval. During the WRITE time interval, the computer 28 couples data representing newly entered parameters along line 59 to the memory means 60. A resistor 122 couples the +5 V potential to the energization input 61 during normal operation of the transmitter. Resistor 122 isolates the +5 V supply from the high energization level at energization input 61 during a WRITE interval.

In a preferred embodiment, the memory means 60 comprises an electrically eraseable read only memory or EEPROM such as a part number HI3104P manufactured by Hughes. The switches 118, 106 and 110 are preferably MOSFET transistors such as type VP0104N3 manufactured by Supertex Inc. and the switch 104 is preferably a MOSFET transistor such as a type VN0104N3 manufactured by Supertex Inc.

What is claimed is:

1. A transmitter for deriving energization from, receiving input data modulated on, and transmitting output data by modulation of, a loop current provided by a external power source over a current loop, the transmitter having instantaneous power demands exceeding minimum instantaneous power available from the loop current, the transmitter comprising:
    sensor means for generating measured values of a process variable;
    computing means coupled to the sensor means for receiving the measured values, executing a function using the measured value and modulating an output signal with the loop current as determined by the result of execution of the function;
    receiver means connected between the current loop and the computing means for coupling data received as modulated input signals on the current loop to the computing means, the data including parameters relating to execution of the function;
    memory means coupled to the computing means for storing the coupled data when energized at a first energization rate; and
    energization means coupled between the current loop and the memory means for receiving energization from the current loop at a second energization rate lower than the first energization rate and lower than the minimum instantaneous power available from the loop current and for selectively energizing the memory means at the first energization rate.

2. A transmitter as recited in claim 1 wherein the energization means energizes the memory means at the first energization rate during a WRITE time interval.

3. A transmitter as recited in claim 2 and further comprising means for allowing a limited portion of the loop current to be coupled from the loop to the energization means, wherein the energization coupled from the energization means to the memory means comprises a WRITE current having a magnitude during the WRITE time interval larger than the magnitude of the portion of the loop current.

4. A transmitter as recited in claim 3 wherein the energization means comprises storage means for storing energy.

5. A transmitter as recited in claim 4 wherein the storage means comprises a first capacitor.

6. A transmitter as recited in claim 5 wherein the storage means further comprises a second capacitor.

7. A transmitter as recited in claim 6 wherein the energization means further comprises switching means for selectively coupling the first and second capacitors to an energization input for the memory means.

8. A transmitter as recited in claim 7 wherein the computing means is coupled to the switching means for controlling the selective energization of the memory means.

9. A transmitter as recited in claim 8 wherein the switching means couples the first and second capacitors in series with the memory means during the WRITE time interval to provide a desired level of excitation to the memory means.

10. A transmitter as recited in claim 9 wherein the loop current comprises a 4 to 20 mA current.

11. A transmitter as recited in claim 10 wherein the memory means comprises a non-volatile memory.

12. A transmitter as recited in claim 11 wherein the non-volatile memory comprises an electrically eraseable programmable read-only memory.

13. A transmitter as recited in claim 12 wherein the sensor means comprises a capacitive pressure sensor.

14. A transmitter as recited in claim 13 wherein the energization means further comprises means for limiting the quantity of energy coupled to the storage means.

15. A process variable transmitter for deriving energization from, receiving input data modulated on, and transmitting output data by modulation of, a loop current signal provided by a external power source over a current transmission loop, the transmitter having instantaneous power demands exceeding minimum instantaneous power available from the loop current signal, the transmitter comprising:
    first and second terminals for connection of the transmitter into the current transmission loop;
    sensor means for generating a sensor data signal related to a process variable;
    memory for storing data including programs and operating parameters for the programs;

a computer connected to the sensor means for receiving the sensor signal, for executing programs from the memory using the sensor signal as a data input signal, for developing a data output signal having a relationship to the process variable for transmission onto the current transmission loop, and for determining when instantaneous power demands of the transmitter exceed a predetermined level; and an amplifier under the control of the computer connected between the first and second terminals for modulating the data output signal with the loop current signal;

a demodulator connected to the current transmission loop for demodulating data input signals from the loop current signal and transmitting the data input signals to the computer, where the data input signals can include data for storage in the memory;

an energy storage network connected to the memory to provide power at the command of the computer at an instantaneous rate exceeding the minimum instantaneous rate available from the current transmission loop; and a voltage regulator connected between the current transmission loop and the computer and providing current to the computer at a first regulated potential and further connected between the current transmission loop and the energy storage network for providing current at a second regulated potential to the energy storage network, wherein the voltage regulator takes power from the current loop at a rate not exceeding the minimum instantaneous power available from the loop current signal.

16. A process variable transmitter as recited in claim 15, wherein the memory includes a nonvolatile portion which requires instantaneous power at a level exceeding the predetermined level whenever data is to be stored in the nonvolatile portion and wherein the computer transmits a command to the energy storage network to provide energization to the memory at some time after receipt by the computer of input data for storage to the nonvolatile portion.

17. A process variable transmitter as recited in claim 16, wherein the energy storage network is connected between a terminal of the voltage regulator at which the second regulated level of potential appears and an energization input to the memory.

18. A process variable transmitter as recited in claim 15, wherein the sensor means further comprise a sensor and an analog to digital converter.

* * * * *